United States Patent
Alasti et al.

(10) Patent No.: US 10,750,337 B1
(45) Date of Patent: Aug. 18, 2020

(54) COEXISTENCE OF MULTIPLE AIR INTERFACE SIDE-LINKS ON ADJACENT CHANNELS

(71) Applicant: DISH Wireless L.L.C., Englewood, CO (US)

(72) Inventors: Mehdi Alasti, Reston, VA (US); Mariam Sorond, Reston, VA (US); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 16/277,116

(22) Filed: Feb. 15, 2019

(51) Int. Cl.
| H04W 4/00 | (2018.01) |
| H04W 4/40 | (2018.01) |
| H04W 72/04 | (2009.01) |

(52) U.S. Cl.
CPC ......... *H04W 4/40* (2018.02); *H04W 72/0453* (2013.01)

(58) Field of Classification Search
None
See application file for complete search history.

(56) References Cited

U.S. PATENT DOCUMENTS

| 2017/0094672 | A1* | 3/2017 | Yerramalli | H04J 11/0023 |
| 2018/0020365 | A1 | 1/2018 | Xiong et al. | |
| 2018/0048435 | A1 | 2/2018 | Islam et al. | |
| 2018/0131493 | A1* | 5/2018 | Luo | H04W 72/0446 |
| 2018/0227155 | A1* | 8/2018 | Khoryaev | H04L 27/2602 |
| 2018/0288589 | A1 | 10/2018 | Punithan et al. | |
| 2018/0310341 | A1* | 10/2018 | Yerramalli | H04B 1/7156 |
| 2018/0376474 | A1* | 12/2018 | Khoryaev | H04W 72/0446 |
| 2019/0110313 | A1* | 4/2019 | Islam | H04W 74/006 |
| 2019/0116592 | A1* | 4/2019 | Moon | H04L 5/0044 |
| 2019/0141647 | A1* | 5/2019 | Nimbalker | H04L 5/001 |
| 2019/0174547 | A1* | 6/2019 | Khoryaev | H04B 17/318 |
| 2019/0274121 | A1 | 9/2019 | Wu et al. | |
| 2020/0100119 | A1* | 3/2020 | Byun | H04W 72/044 |

OTHER PUBLICATIONS

U.S. Appl. No. 16/277,184, filed Feb. 15, 2019, Non Final Office Action dated Sep. 13, 2019, all pages.
U.S. Appl. No. 16/277,184, filed Feb. 15, 2019 Notice of Allowance dated Jan. 27, 2020, all pages.

(Continued)

*Primary Examiner* — Elisabeth Benoit Magloire (57) ABSTRACT

Various arrangements for using different air interfaces on adjacent frequency channels for side-link communications are presented. A first side-link channel may be split into a first bandwidth portion and the second bandwidth portion, in which the first bandwidth portion of the first side-link channel is directly adjacent to the second side-link channel. A first subcarrier spacing may be assigned to the first bandwidth portion of the first side-link channel. The second side-link channel may also use the first subcarrier spacing. A second subcarrier spacing may be assigned to the second bandwidth portion of the first side-link channel that differs from the first subcarrier spacing.

20 Claims, 6 Drawing Sheets

(56) References Cited

OTHER PUBLICATIONS

LG Electronics Inc.: "Summary of Offline Discussion: WF for "Study on NR V2X" in RAN3", 3GPP Draft; R3-187223 Summary of Offline Discussion_WF for Study on NR V2X in RAN3_V0, 3$^{rd}$ Generation Partnership Project (3GPP), Mobile Competence Centre; 650, Route des Lucioles; F-06921 Sophia-An, vol. RAN WG3, No. Spokane, USA; Nov. 12, 2018-Nov. 16, 2018 Nov. 20, 2018, XP051495607, Retrieved from the Internet: URL: http://ww.3gppp.org/ftp/tsg%5Fran/WG3%5Flu/TSGR3%5F102/Docs/R3%2D187223%2Ezip [retrieved on Nov. 20, 2018] Section 2.

NTT Docomo et al.: "Discussion on Inter-cell and Inter-carrier D2D", 3GPP Draft; R1-142270 Discussion on Inter-cell Inter-carrier D2D, 3$^{rd}$ Generation Partnership Project, Mobile Competence Centre; 650, Route des Lucioles; F-06921 Sophia-Antipolis Cedex; France, vol. Ran WG1, No. Seoul, Korea; May 19, 2014-May 23, 2014 May 18, 2014, XP050787864, Retrieved from the Internet: URL:http://www.3gppp.org/ftp/Meetings_3GPP_SYNC/RAN1/Docs/ [retrieved on May 18, 2014] Section 3.

International Search Report and Written Opinion for PCT/US2020/016506 dated Apr. 24, 2020, all pages.

Intel Corporation: "In-device Coexistence Mechanisms for NR V2X Communication", 3GPP Draft; R1-1900488 Intel—EV2X_COEX, 3$^{rd}$ Generation Partnership Project, Mobile Competence Centre; 650, Route des Lucioles; F-06921 Sophia-Antipolis Cedex; France, vol. RAN WG1, No. Taipei, Taiwan; Jan. 21, 2019-Jan. 25, 2019 Jan. 20, 2019, XP051593401, Retrieved from the Internet: URL: http/www.3gpp.org/ftp/Meetins%5F3GPP%5FSYNC/RAN1/Docs/R1%2D1900488%2Ezip [retrieved on Jan. 20, 2019] the whole document.

Huawei, et al: "Sidelink physical layer structure for NR V2X", 3GPP Draft; R1-1900022, 3$^{rd}$ Generation Partnership Project, Mobile Competence Centre; 650, Route des Lucioles; F-06921 Sophia-Antipolis Cedex; France, vol. Ran WG1, No. Taipei; Jan. 21, 2019-Jan. 25, 2019 Jan. 20, 2019, XP051592948, Retrieved from the Internet: URL:http://www.3gpp.org/ftp/Meetings%5F3GPP%5FSYNC/RAN1/Docs/R1%2D1900022%2Ezip [retrieved on Jan. 20, 2019] sections 5 and 6; p. 4-p. 7; figures 3-6.

International Search Report and Written Opinion for PCT/US2020/016582 dated Apr. 24, 2020, all pages.

\* cited by examiner

Determine a first side-link channel of a first air interface is directly adjacent to a second side-link channel of a second air interface 505

Split the first side-link channel into a first bandwidth part and a second bandwidth part 510

Assign a subcarrier spacing that matches subcarrier spacing of the second side-link channel of the second air interface to the first bandwidth part of the first side-link channel that is adjacent to the second side-link channel 515

Assign a different subcarrier spacing to the second bandwidth part of the first side-link channel that is not adjacent to the second side-link channel 520

Transmit an indication of subcarrier spacing of the first bandwidth part, the second bandwidth part, or both to UE 525

Perform sidelink communications by instances of UE using the first side-link channel and the second side-link channel 530

COEXISTENCE OF MULTIPLE AIR INTERFACE SIDE-LINKS ON ADJACENT CHANNELS

CROSS-REFERENCES TO RELATED APPLICATIONS

This application is related to U.S. patent application Ser. No. 16/277,184, entitled "Coexistence of Multiple Air Interface Side-links on a Channel," filed on the same day as this application, the entire disclosure of which is hereby incorporated by reference in its entirety.

BACKGROUND

Typically, air interface communication protocols, such as 4G LTE and 5G NR are used to communicate between user equipment (UE) and a cellular network base station. However, side-link communication is also possible. In side-link communications, an instance of UE communicates with another instance of UE directly, which can be autonomous or scheduled by a base station. Such direct communication may be useful if there is data that would be useful to transmit to particular instances of UE that are in the immediate vicinity of a transmitting UE.

While such side-link communications may be beneficial in certain instances, not all UE may use the same air interface communication protocol. Therefore, the ability of various instances of UE to coexist may result in significant inefficiencies, such as different frequency bands being needed to be allocated to each air interface.

SUMMARY

Various embodiments are described related to a method for using different air interfaces on adjacent frequency channels for side-link communications. In some embodiments, a method for using different air interfaces on adjacent frequency channels for side-link communications is described. The method may include determining, by an air interface management server system, to set subcarrier spacing in a first side-link channel based on subcarrier spacing of a second side-link channel. The first side-link channel may use a first air interface and the second side-link channel may use a second air interface. The method may include splitting, by the air interface management server system, the first side-link channel into a first bandwidth portion and the second bandwidth portion. The first bandwidth portion of the first side-link channel may be directly adjacent to the second side-link channel. The method may include assigning, by the air interface management server system, a first subcarrier spacing to the first bandwidth portion of the first side-link channel. The second side-link channel may use the first subcarrier spacing. The method may include assigning, by the air interface management server system, a second subcarrier spacing to the second bandwidth portion of the first side-link channel. The second subcarrier spacing may differ from the first subcarrier spacing. The method may include providing to a plurality of instances of user equipment (UE) that may communicate using the first air interface, an indication of the first subcarrier spacing, the second subcarrier spacing, the first bandwidth portion, and the second bandwidth portion.

Embodiments of such a method may include one or more of the following features: the second air interface may be a 4G LTE air interface. The first air interface may be a 5G NR air interface. The method may include performing a smart scheduling technique to avoid potential interference between side-link communications on the first side-link channel in the first bandwidth portion and the second bandwidth portion. The method may include transmitting, by a first instance of UE, a first side-link communication using the first air interface as part of the first bandwidth portion using the first subcarrier spacing based on being provided the indication of the first subcarrier spacing, the second subcarrier spacing, the first bandwidth portion, and the second bandwidth portion. The method may include transmitting, by a first instance of UE, a second side-link communication using the first air interface as part of the second bandwidth portion using the second subcarrier spacing based on being provided the indication of the second subcarrier spacing and the second bandwidth portion. The method may include changing the second subcarrier spacing to a third subcarrier spacing for the second bandwidth portion of the first side-link channel while maintaining the first subcarrier spacing for the first bandwidth portion of the first side-link channel. The side-link communications may be selected from a group consisting of vehicle to vehicle communications, vehicle to infrastructure communications, and vehicle to pedestrian communications. The side-link communications may include basic safety messages (BSMs). Each BSM may include vehicle size data, position data, speed data, heading data, acceleration data, and brake system status data.

In some embodiments, a system that uses different air interfaces in adjacent side-link frequency channels is described. The system may include a first air interface system. The system may include a plurality of instances of user equipment (UE). The system may include an air interface management server system configured to determine to set subcarrier spacing in a first side-link channel based on subcarrier spacing in a second side-link channel. The first side-link channel may use a first air interface and the second side-link channel may use a second air interface. The system may be configured to split the first side-link channel into a first bandwidth portion and the second bandwidth portion. The first bandwidth portion of the first side-link channel may be directly adjacent to the second side-link channel. The system may be configured to assign a first subcarrier spacing to the first bandwidth portion of the first side-link channel. The first side-link channel may use the first subcarrier spacing. The system may be configured to assign a second subcarrier spacing to the second bandwidth portion of the first side-link channel. The second subcarrier spacing may differ from the first subcarrier spacing. The system may be configured to provide, to the plurality of instances of UE via the first air interface system, an indication of the first subcarrier spacing, the second subcarrier spacing, the first bandwidth portion, and the second bandwidth portion.

Embodiments of such a method may include one or more of the following features: the first air interface may be a 5G NR air interface. The second air interface may be 4G LTE air interface. The air interface management server system may be further configured to perform a smart scheduling technique to avoid potential interference between side-link communications on the first side-link channel in the first and second bandwidth portions. A first instance of UE of the plurality of instances of UE may transmit a first side-link communication using the first air interface as part of the first bandwidth portion using the first subcarrier spacing based on being provided the indication of the first subcarrier spacing and the first bandwidth portion. The first instance of UE of the plurality of instances of UE may transmit a second side-link communication using the first air interface as part of the second bandwidth portion using the second subcarrier spacing based on being provided the indication of the second subcarrier spacing and the second bandwidth portion. The air interface management server system may be further configured to change the second subcarrier spacing to a third subcarrier spacing for the second bandwidth portion of the first side-link channel while maintaining the first subcarrier spacing for the first bandwidth portion of the first side-link channel. The side-link communications may be selected from a group consisting of vehicle to vehicle communications, vehicle to infrastructure communications, and vehicle to pedestrian communications. The side-link communications may include basic safety messages (BSMs).

In some embodiments, a vehicle system that uses different air interfaces on adjacent frequency channels for side-link communications is described. The system may include a first air interface component that may perform side-link communications using a first air interface. The system may include a vehicle systems interface. The system may include one or more processors configured to receive a subcarrier spacing assignment message via the first air interface. The subcarrier spacing assignment message may indicate a first bandwidth portion of a first side-link channel, a second bandwidth portion of the first side-link channel, a first subcarrier spacing for the first bandwidth portion, and a second subcarrier spacing for the second bandwidth portion. The first bandwidth portion may be adjacent to a second side-link channel that may use the first subcarrier spacing and a second air interface. The one or more processors may be configured to cause a first side-link communication to be transmitted using the first air interface and the first bandwidth portion of the first side-link channel and the first subcarrier spacing. The one or more processors may be configured to cause a second side-link communication to be transmitted using the first air interface and the second bandwidth portion of the first side-link channel and the second subcarrier spacing.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Various air interfaces allow for instances of UE to communicate using side-links. A side-link refers to a direct wireless communication between two instances of UE, without using a cellular network base station or other form of relay. Such a side-link may be autonomous (radio resources are chosen for the side-link communication without scheduling from the base-station), or scheduled by the base-station (the base-station assigns the resources for the communication and the UEs receive messages indicating as such). UE can include vehicle communication systems, infrastructure communication systems, and pedestrian systems. Vehicle communication systems may be built into a vehicle (e.g., car, truck, motorcycle, scooter, train, boat, tram, subway, etc.); infrastructure systems may be installed at various pieces of infrastructure, such as bridges, roadways, highways, traffic lights, buildings, parking facilities, etc. Pedestrian communication systems may include mobile devices, such as smartphones, that a pedestrian may carry on his body. Side-link communications, as defined by 3GPP include vehicle-to-vehicle (V2V) side-link communications. However, it can be understood, that other forms of communications are possible that can also be considered side-links, such as vehicle-to-infrastructure (V2I) side-link communications; and vehicle-to-pedestrian (V2P) communications. Such V2P and V2I communications can be understood as a form of device to device (D2D) or ProSe communication, that is performed directly or via a base station. Such direct communication may be useful if there is data that would be useful to transmit to particular instances of UE that are in the immediate vicinity of a transmitting UE.

Such side-link communications may allow for safety information to be quickly and efficiently exchanged between instances of UE located in the vicinity of each other. For example, side-link communications may typically be performed over distances of 1000 feet or less. Such side-link communications may involve basic safety messages (BSMs) being transmitted and received via side-link communications. BSMs may include data such as: a timestamp; position (latitude, longitude, elevation); speed; heading; acceleration; brake system status; vehicle size; steering wheel angle; positional accuracy; braking history; path prediction; throttle position; vehicle mass; trailer weight; vehicle type; vehicle description; anti-lock brake system (ABS) status; traction control status; stability control status; differential GPS; lights status; wiper status; brake level; coefficient of friction; rain type; air temperature; air pressure; vehicle identification; cargo weight; and GPS status. Such data may be transmitted via a side-link using an air interface to other instances of UE in the immediate vicinity.

In order to successfully communicate using a side-link communication, the same air interface needs to be used by the transmitting UE and the receiving UE. For example, side-link communications may use 4G LTE (Long Term Evolution) as the air interface communication protocol or may use 5G NR (New Radio) as the air interface communication protocol. An instance of user equipment may, for example, be able to communicate: using only 4G LTE; using only 5G NR; or using both air interface communication protocols. It can be expected that UE that communicate using 5G NR will be backwards-compatible with 4G LTE. Other air interface communication protocols may also be possible.

Side-links performed using air interfaces that use different communication protocols (such as 4G LTE and 5G NR) may be performed using adjacent frequency bands. Such different air interface communication protocols may use different subcarrier spacing, which can cause interference due to the lack of orthogonality if the air interfaces are used for communication on frequencies that are not adequately spaced. However, multiple air interface communication protocols can be used concurrently on adjacent frequency channels as detailed herein if subcarrier spacing is managed as detailed herein.

Figure 1:
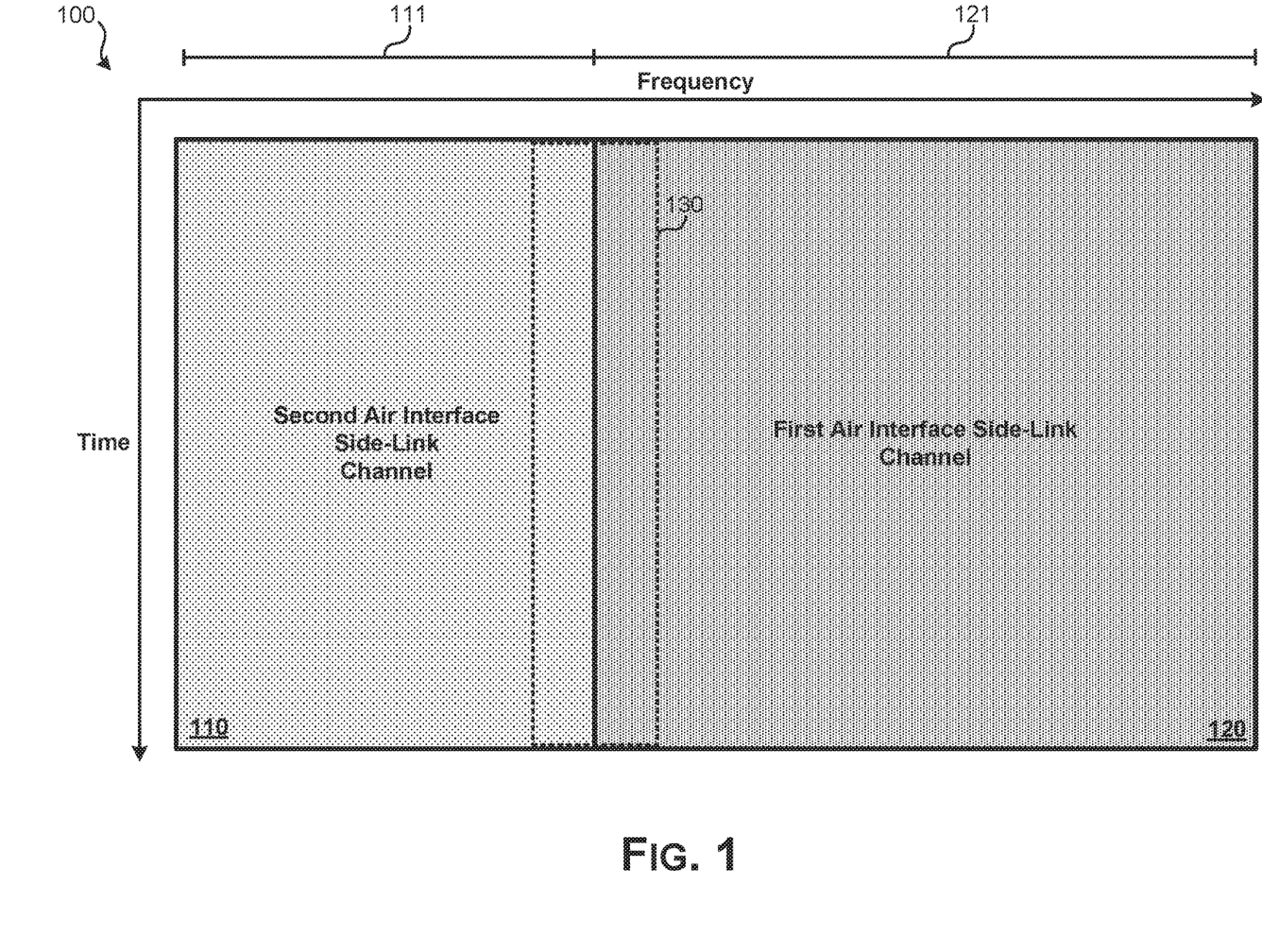
FIG. 1 illustrates an embodiment of adjacent channels that use different air interfaces.

Further detail regarding the embodiments are provided in relation to the figures. FIG. 1 illustrates an embodiment 100 of adjacent channels that use different air interfaces. In embodiment 100, first air interface side-link channel 120 is directly adjacent in frequency to second air interface side-link channel 110. First air interface side-link channel 120 can be for a first air interface, such as 5G NR. Second air interface side-link channel 110 can be used for a second, different air interface, such as 4G LTE. While second channel air interface side-link channel 110 may be allocated frequency channel 111; first air interface side-link channel 120 may be allocated frequency channel 121.

The first air interface may not be compatible with the second air interface. For example, different subcarrier spacing may be used within each frequency channel for the different air interfaces. For instance, the air interface of second air interface side-link channel 110 may use a fixed subcarrier spacing, such as 15 kHz. However, the air interface of first air interface side-link channel 120 may use a variable subcarrier spacing, which may be adjusted among 15 kHz, 30 kHz, or 60 kHz (or some other subcarrier spacing). An advantage to using a higher subcarrier spacing is that orthogonal frequency-division multiplexing (ODFM) symbol durations may be shortened, which can significantly reduce latency of communication. While the first air interface may use a separate frequency channel than the second air interface, since the frequency channels are adjacent, differences in subcarrier spacing between the air interfaces at the frequencies near where the channels are adjacent (represented by region 130) can result in interference among side-link communications.

Figure 2:
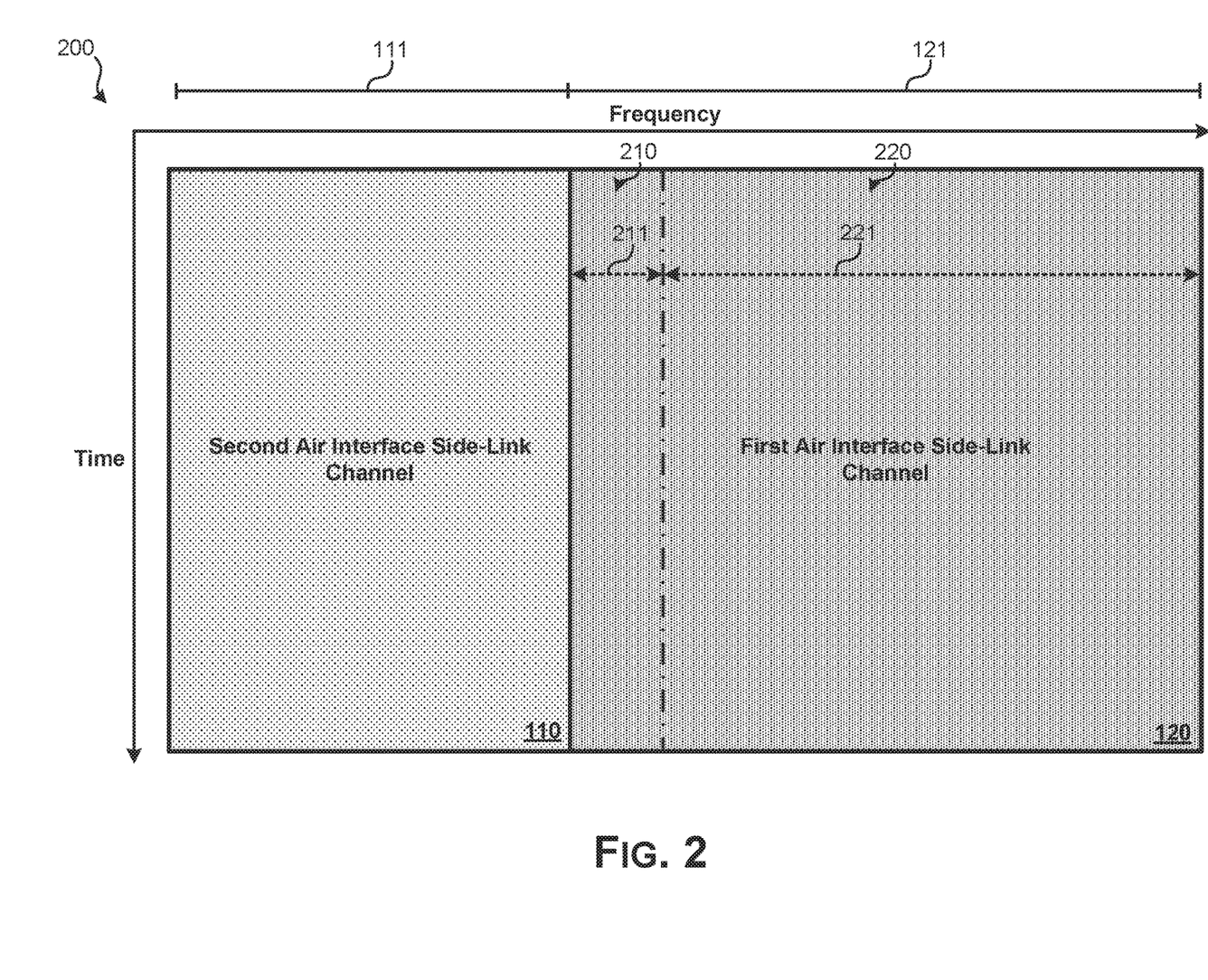
FIG. 2 illustrates an embodiment of adjacent channels that use different air interfaces of which one channel has been subdivided in separate bandwidth parts having different subcarrier spacing.

FIG. 2 illustrates an embodiment 200 of adjacent channels that use different air interfaces of which one channel has been subdivided into separate bandwidth parts or portions having different subcarrier spacing. In embodiment 200, first air interface side-link channel 120 has been split into first bandwidth part 210 and second bandwidth part 220. First bandwidth part 210 may include frequencies 211 and second bandwidth part 220 may include frequencies 221. While both of first bandwidth part 210 and second bandwidth part 220 are part of the first air interface side-link channel 120, these bandwidth parts may have different subcarrier spacings.

The subcarrier spacing of bandwidth part 210 may be matched to the subcarrier spacing of second air interface side-link channel 110, which is directly adjacent to first bandwidth part 210. The subcarrier spacing of second bandwidth part 220 may be variable. For example, for 5G NR, two distinct frequency ranges can be used. The first frequency range, FR1, which spans from 450 MHz to 6 GHz, may use subcarrier spacings of 15 kHz, 30 kHz, or 60 kHz. The second frequency range, FR2, which spans from 24.25 GHz to 52.6 GHz, may use subcarrier spacings of 60 kHz, 120 kHz, or 240 kHz. This subcarrier spacing may be selected based on factors such as amount of communication traffic and the traffic's tolerance for latency (that is, the greater the subcarrier spacing, the fewer communications that can be simultaneously transmitted, but the shorter the latency due to the ODFM symbol duration.

Notably, by having the difference in subcarrier spacings existing between first bandwidth part 210 and second bandwidth part 220 (as opposed to between second air-interface side-link channel 110 and first air interface side-link channel 120), interference issues due to the mismatch in subcarrier spacing can be managed using only the air interface system associated with first air interface side-link channel 120. For example, a 5G NR cellular system, in coordination with the instances of UE that will perform the side-link communications, may perform various scheduling techniques, such as by using a time-division multiplex access (TDMA) process between subcarriers that interfere with each other in first bandwidth part 210 and second bandwidth part 220. That is, instances of UE may be provided with indications of time slices that may be used on particular subcarrier channels for side-link communications.

There are several smart-scheduling techniques that may be used, such as with 5G NR, to mitigate the interference between different subcarrier spacings. For example, 5G NR can use Filtered-OFDM (a.k.a. sub-band filtering) in a frequency domain or Windowed-OFDM (a.k.a. Time-Domain windowing) to mitigate the cross interference between different sub-carrier spacings, and as a result, to minimize the required guard-band between different bandwidth parts with different subcarrier spacings. If the side-band communications are scheduled by a 5G NR gNodeB, the gNodeB scheduler can schedule both the UEs homed on bandwidth part 1 (using subcarrier spacing 1) as well as the UEs homed on bandwidth part 2 (using subcarrier spacing 2). Therefore, the gNodeB can use scheduling techniques, e.g., scheduling interfering transmissions at different times, or scheduling an increase in frequency separation. Another scheduling technique can be to split a data packet into multiple smaller sub-packets and schedule each sub-packet with different channel protection depending on the inter subcarrier interference on the channel. In other words, the sub-packet closer to the other bandwidth part in frequency, can be protected more than the sub-packet farther away. If the side-band communications are autonomous, then the UEs may sense interference on the channel and use part of the bandwidth part having the smallest or an acceptable level of interference. Collisions may occur during a transmission, but the multiple access methods can reduce the probability of collision.

Figure 3:
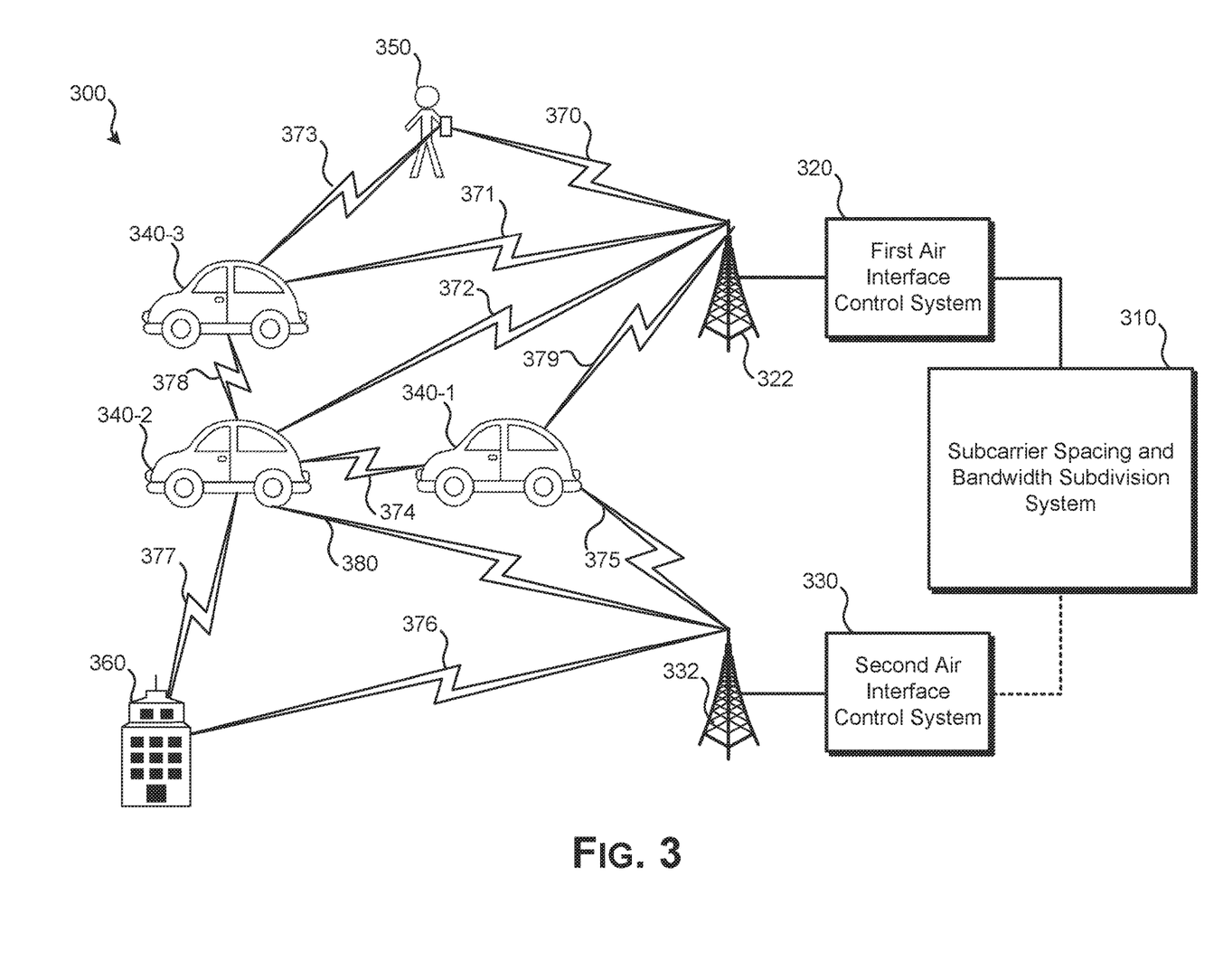
FIG. 3 illustrates a system that uses multiple air interfaces for side-link communications using adjacent side-link channels.

FIG. 3 illustrates a system 300 that uses multiple air interfaces for side-link communications. System 300 may include: subcarrier spacing and bandwidth subdivision system 310; first air interface control system 320; second air interface control system 330; base station 322; base station 332; pedestrian UE 350 (which is represented on FIG. 3 as a pedestrian holding a UE); vehicles 340 (240-1, 340-2, 340-3); and infrastructure 360.

Subcarrier spacing and bandwidth subdivision system 310 can represent one or more server systems that can either statically, semi-statically, or dynamically split and assign bandwidth parts within the first air interface side-link channel and may assign the subcarrier spacings within such bandwidth parts. In this context, "statically" means setting the frequency at which the bandwidth parts are set and the subcarrier spacings once with the intention of maintaining the same arrangement for an extended period of time.

"Semi-statically" may involve the subcarrier spacings being reevaluated and, possibly, changed periodically, such as once per hour or once per day. "Dynamically" means reassessing the frequency at which the bandwidth parts are set and the subcarrier spacings occasionally or periodically, such as based on communication traffic or changing needs.

Subcarrier spacing and bandwidth subdivision system 310 may be operated by a particular cellular network provider or may be used to coordinate subcarrier spacings for an air interface across multiple cellular network service providers. If subcarrier spacing and bandwidth subdivision system 301 is operated by a particular cellular network provider, it may be in communication with a master coordination system that communicates with subcarrier spacing and bandwidth subdivision systems operated by multiple cellular network providers or may communicate with subcarrier spacing and bandwidth subdivision systems operated by other cellular service providers such that the side-band resources are divided consistently across service providers in a given geographic region (thus allowing for communication among UE of different service providers).

Subcarrier spacing and bandwidth subdivision system 310 may communicate with first air interface control system 320. In some embodiments, it may also communicate with second air interface control system 330. First air interface control system 320 and second air interface control system 330 can represent control systems that are part of wireless networks that use different air interface communication protocols. By way of example, first air interface control system 320 may use 5G NR as its air interface communication protocol and second air interface control system 330 may use 4G LTE as its air interface communication protocol. First air interface control system 320 may be notified of a frequency channel for side-link communications that is to be split into at least two bandwidth parts having different subcarrier spacings. First air interface control system 320 may be notified of the frequency of the split within the first air interface side-link channel, different subcarrier spacings to be used on each bandwidth part, and, possibly, a scheduling scheme or plan to be used to prevent interference between the bandwidth parts that have different subcarrier spacings.

In some embodiments, subcarrier spacing and bandwidth subdivision system 310 may be integrated as part of first air interface control system 320. Since all of the subcarrier spacing adjustments and bandwidth parts are defined for the first air interface only, no communication or adjustments may be necessary that require subcarrier spacing and bandwidth subdivision system 310 to communicate with second air interface control system 330.

In system 300, for example, The first air interface may be 5G NR. In such an embodiment, base station 322 may be a gNodeB. First air interface control system 320 may be part of the core 5G network or may be incorporated as part of the gNodeB. The second air interface may be 4G LTE. In such an embodiment, base station 332 may be an eNodeB. Second air interface control system 330 may be part of the enhanced packet core (EPC) of the 4G LTE network or may be incorporated as part of the eNodeB.

In system 300, pedestrian UE 350, vehicle 340-3, vehicle 340-2, and vehicle 340-1 communicate using the first air interface; vehicle 340-1, and infrastructure 360 communicate using the second air interface. Pedestrian UE 350 communicates with base station 322 via wireless link 370; vehicle 340-3 communicates with base station 322 via wireless link 371; vehicle 340-2 communicates with base station 322 via wireless link 372; and vehicle 340-1 communicates with base station 322 via wireless link 379. Vehicle 340-1 communicates with base station 332 via wireless link 375; vehicle 340-2 communicates with base station 332 via wireless link 380; and infrastructure 360 communicates with base station 332 via wireless link 376. In system 300, side-link communications may be in the form of broadcast messages or messages transmitted to specific other instance of UE in the vicinity. Various side-link communications are present: side-link 373 (which is vehicle-to-pedestrian); side-link 378 (which is vehicle-to-vehicle); side-link 374 (which is vehicle-to-vehicle); and side-link 377 (which is vehicle-to-infrastructure).

Side-link 373 may be performed using the first air interface and using either the first bandwidth part using a first subcarrier spacing or the second bandwidth part using a second, different subcarrier spacing as determined by subcarrier spacing and bandwidth subdivision system 310. Side-link 378 may also be performed using the first air interface using either the first bandwidth part using a first subcarrier spacing or the second bandwidth part using a second, different subcarrier spacing as determined by subcarrier spacing and bandwidth subdivision system 310.

However, vehicle 340-2 may have UE that is also capable of communicating using the second air interface. Side-link 374 may be performed using second air interface side-link channel 110. Side-link 377 may also be performed using the second air interface using second air interface side-link channel 110.

Figure 4:
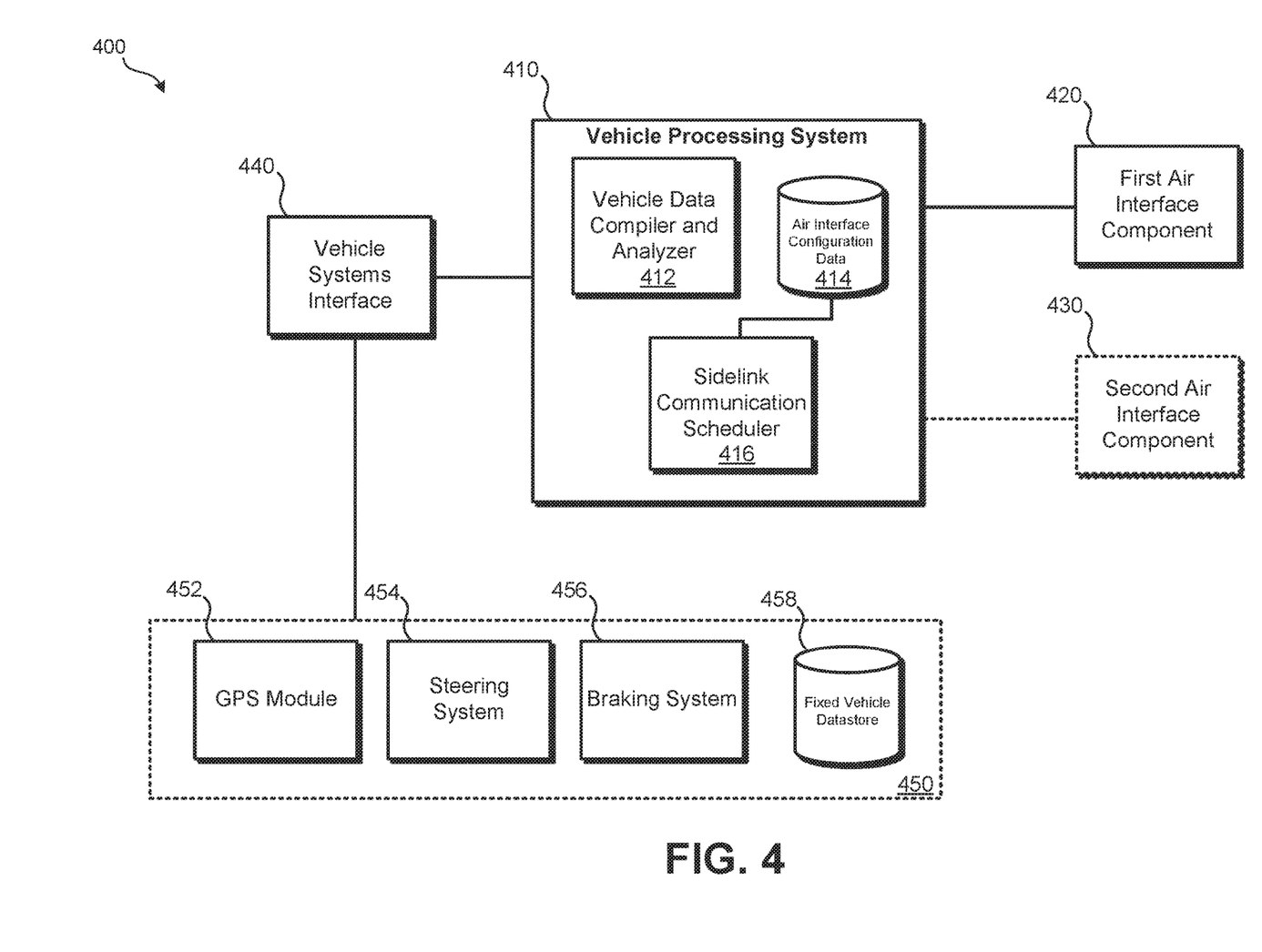
FIG. 4 illustrates an embodiment of a vehicle system that can communicate using multiple air interfaces.

FIG. 4 illustrates an embodiment of a vehicle system 400 that can communicate using multiple air interfaces. An embodiment of vehicle system 400 may be present on vehicle 340-1 and 340-2. On vehicle 340-3, an embodiment of vehicle system 400 may present that does not include second air interface component 430. Vehicle system 400 can include: vehicle processing system 410; first air interface component 420; second air interface component 430; vehicle systems interface 440; and vehicle systems 450 (which can include GPS module 452, steering system 454, braking system 456, and fixed vehicle datastore 458).

Vehicle processing system 410 may include one or more special-purpose or general-purpose processors. Such special-purpose processors may include processors that are specifically designed to perform the functions detailed herein. Such special-purpose processors may be ASICs (application-specific integrated circuits) or FPGAs (field-programmable gate arrays) which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). The various components of vehicle processing system 410 may be implemented using such special- or general-purpose processors.

Vehicle processing system 410 may be in communication with first air interface component 420, second air interface component 430, or both. First air interface component 420 may transmit and receive data with a cellular network that uses the first air interface and may perform side-link communications with other instances of UE that communicate using the first air interface. Second air interface component 430 may transmit and receive data with a cellular network that uses the second air interface and may perform side-link communications with other instances of UE that communicate using the second air interface. In some examples, first air interface component 420 communicates using 5G NR and second air interface component communicates using 4G LTE. It should be understood that in other embodiments a greater number (or fewer number) of air interface components may be present. In some embodiments, second air interface component 430 may not be present.

Vehicle processing system 410 may store indications of bandwidth parts of the first air interface side-link channel and subcarrier spacings received via first air interface component 420 in air interface configuration data 414. This data may be accessed by side-link communication scheduler 416 to determine on what subcarrier and what time-windows has been allocated for side-link communications using the first air interface that is to be used for the side-link communication. Side-link communication scheduler 416 may cause the side-link communication to be transmitted as one or more packets on the appropriate subcarrier channels at the appropriate times.

Vehicle data compiler and analyzer 412 may: 1) receive and format data obtained from vehicle systems interface 440 for transmission in the form of one or more messages, such as BSMs; and 2) interpret messages, such as BSMs, received from other instances of UE via side-link communications. Vehicle systems interface 440 may collect data from various vehicle systems 450. For example, such vehicle systems can include: GPS module 452 (e.g., location, elevation, position accuracy); steering system 454 (e.g., steering angle); braking system 456 (e.g., whether or not engaged, amount of braking); and fixed vehicle datastore 458 (e.g., data about the vehicle that does not regularly change, such as vehicle type, vehicle description, etc.). In some embodiments, vehicle systems 450 may communicate directly with vehicle processing system 410. In other embodiments, other vehicle systems may provide data for inclusion in BSMs or other forms of data transmissions via side-links.

BSMs or other types of messages may be broadcast via side-link communications or may be transmitted to particular other instances of UE. In a broadcast form, any instance of UE in the vicinity (within reception range) that communicates using the air interface used to transmit the side-link communication may be able to receive the side-link communication to determine where the instance of UE is located. In an embodiment such as illustrated of vehicle system 400, both first air interface component 420 and second air interface component 430 may be used to transmit similar data as side-link communications using different air interfaces and the assigned sub-pools of resource pools.

Similar systems to vehicle system 400 may be present in pedestrian UE and infrastructure UE to transmit via side-link transmissions the position and state of the instance of UE and to receive and analyze side-link communications received from other instances of UE.

Figure 5:
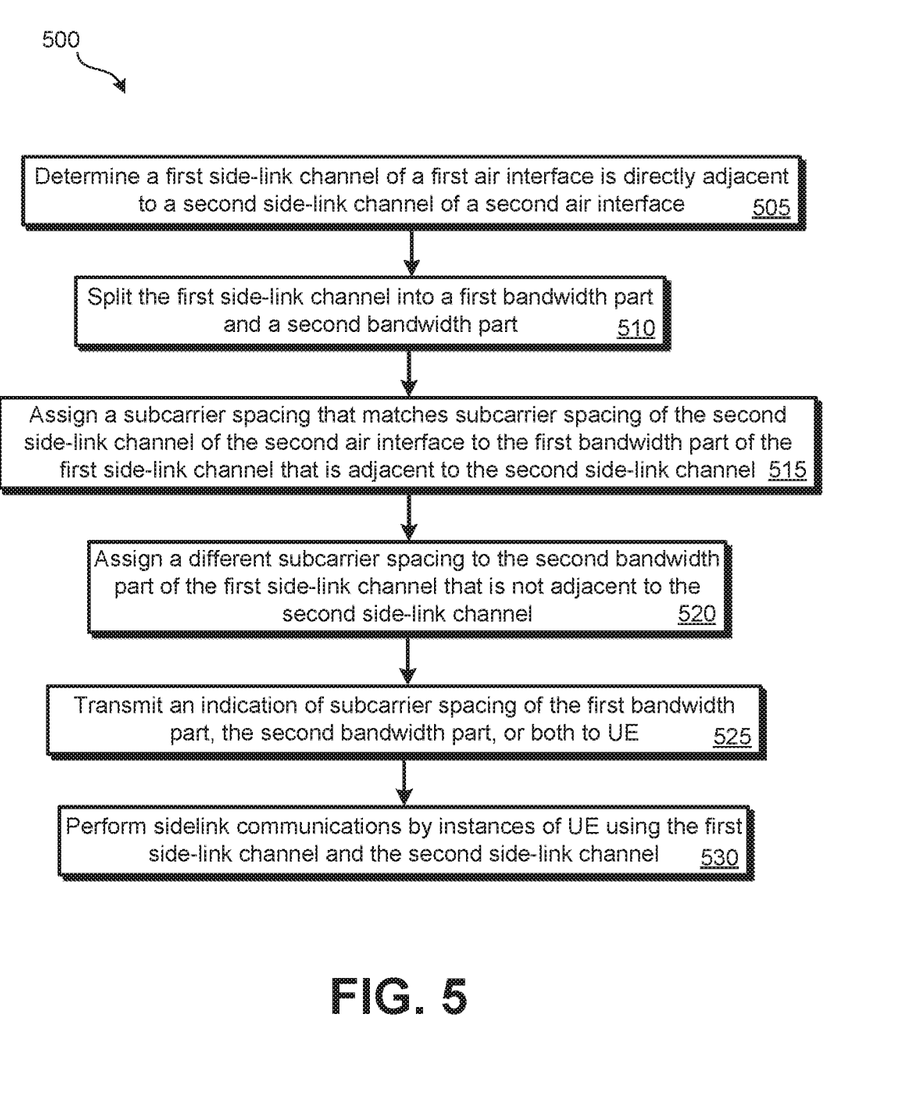
FIG. 5 illustrates an embodiment of a method for using multiple air interfaces on adjacent channels for side-link communications.

Various methods may be performed using the systems detailed in FIGS. 3 and 4 and the side-link channels detailed in relation to FIGS. 1 and 2. FIG. 5 illustrates an embodiment of a method 500 for using multiple air interfaces on adjacent channels for side-link communications. Method 500 may be performed using at least some components of system 300 of FIG. 3. In other embodiments, method 500 may be performed using a system other than system 300 of FIG. 3.

At block 505, a determination may be made that a first air interface side-link channel is directly adjacent to a second air interface side-link channel. Each of these channels may use a different air interface. In some embodiments, the second air interface side-link channel may use a fixed subcarrier spacing, while the first air interface side-link channel may use a variable subcarrier spacing. The determination at block 505 may be performed by a subcarrier spacing and bandwidth subdivision system that is incorporated as part of or in communication with a first air interface control system.

At block 510, a determination may be made that the first air interface side-link channel is to be split into a first bandwidth part and a second bandwidth part. The determination may be made by or using the subcarrier spacing and bandwidth subdivision system. The bandwidth parts (which can include the bandwidth of each portion, start and stop frequencies, subcarrier spacing) can be configured: statically, semi-statically, or dynamically. If the bandwidth parts are configured statically, they may be configured and not changed (unless a system reconfiguration is required). In a semi-static configuration, the bandwidth parts are configured for a period of time, or may change based on a timer (e.g., an activity timer) or an event (e.g., after an event, the control sub-system signals for a change in bandwidth part). In a dynamic configuration, the bandwidth parts can be changed based on traffic, or any other parameter that can change over time. In 5G NR, a UE can be configured to have up to four bandwidth parts but can only have one active bandwidth part at any given time. The active bandwidth part is signaled to the UE either by using Layer 1 signaling or a higher layer signaling from a gNodeB.

The first bandwidth part may be directly adjacent to the second air interface side-link channel. The second bandwidth part may be directly adjacent to the first bandwidth part but not adjacent to the second air interface side-link channel.

At block 515, subcarrier spacing may be assigned to the first bandwidth part of the first air interface side-link channel that matches the subcarrier spacing of the second air interface side-link channel (to which the first bandwidth part is adjacent). This subcarrier spacing may be assigned by the subcarrier spacing and bandwidth subdivision system. In some examples, the second air interface side-link channel is a 4G LTE side-link channel that uses 15 kHz subcarrier spacing. The first air interface side-link channel may be 5G NR. Therefore, the first bandwidth part can use 15 kHz subcarrier spacing.

At block 520, subcarrier spacing may be assigned to the second bandwidth part of the first air interface side-link channel that is not adjacent to the second air interface side-link channel. This subcarrier spacing may be different from the subcarrier spacing of block 515. For example, the subcarrier spacing may be 30 kHz or 60 kHz. This subcarrier spacing may be assigned by the subcarrier spacing and bandwidth subdivision system.

At block 525 a subcarrier assignment message may be transmitted to instances of UE that are communicating with the first air interface control system. The subcarrier assignment message can include an indication of the subcarrier spacing of the first bandwidth part, a subcarrier spacing of the second bandwidth part, the frequency of the split between the first bandwidth part and the second bandwidth part, or some combination thereof. At block 530, instances of UE that received the indication of block 525 may communicate directly using side-link communications that are transmitted using the first subcarrier spacing on the first bandwidth part of the first air interface side-link channel and that use the second subcarrier spacing on the second portion of the first air interface side-link channel. Side-link communications performed by UE using the second air interface and the second air interface side-link channel may be unaffected by the process of method 500 and can proceed unimpeded. In some embodiments, the subcarrier assignment message (or some other message or group of messages) may include scheduling information on how side-link communications sent via the first bandwidth part and the second bandwidth part should be scheduled relative to each other (e.g., a TDMA arrangement).

Figure 6:
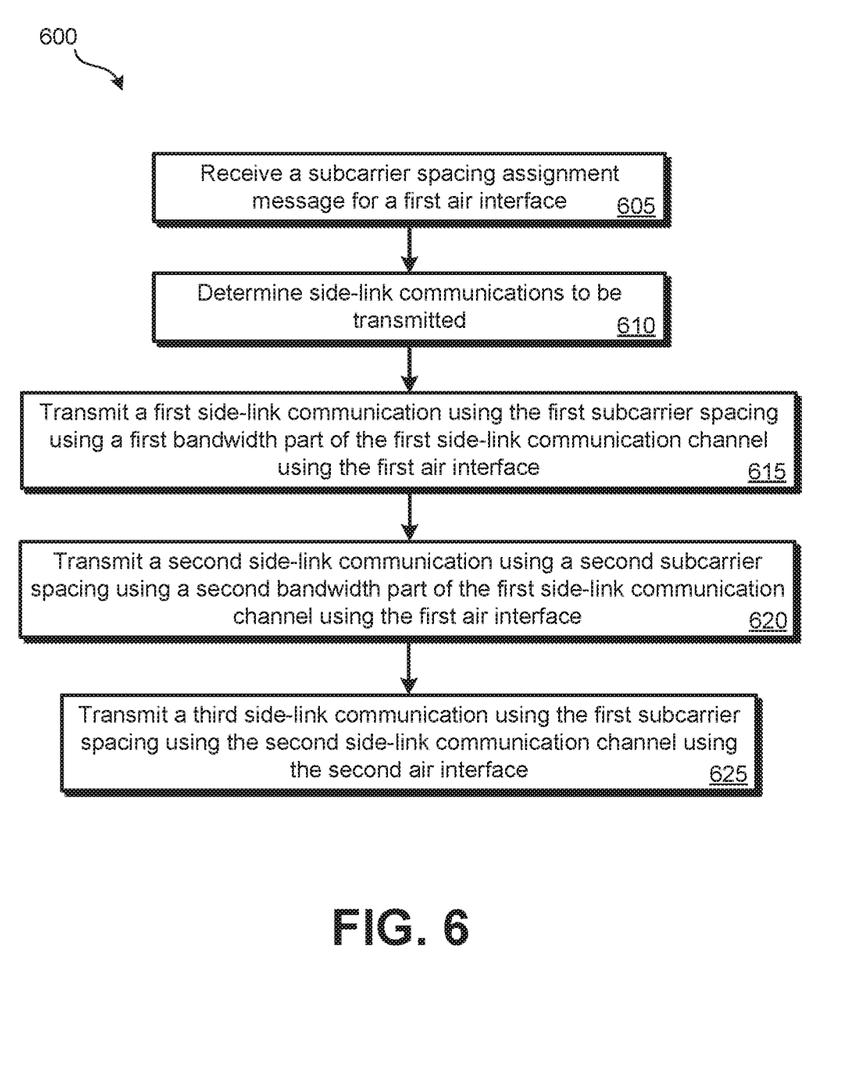
FIG. 6 illustrates an embodiment of a method for a vehicle system using multiple air interfaces on adjacent channels for side-link communications.

FIG. 6 illustrates an embodiment of a method 600 for a vehicle system using multiple air interfaces on adjacent channels for side-link communications. Each step of method 600 may be performed by an instance of UE, such as vehicle system 400.

At block 605, a subcarrier assignment message may be received by an instance of UE via a first air interface (e.g., 5G NR) for a first air interface side-link channel. The subcarrier assignment message can include: an indication of a first subcarrier spacing of the first bandwidth part, an indication of a second subcarrier space of the second bandwidth part, the frequency of the split between the first bandwidth part and the second bandwidth part, or some combination thereof. In some embodiments, the subcarrier assignment message (or some other message or group of messages) may include scheduling information on how side-link communications sent via the first bandwidth part and the second bandwidth part should be scheduled relative to each other (e.g., a TDMA arrangement).

At block 610, one or more side-link communications may be determined that are to be transmitted. For example, a side-link communication may be a BSM that is to be transmitted as a broadcast message or as a message addressed to a particular nearby instance of UE. Such side-link communications may be determined to be transmitted using the first air interface as part of the first-air interface side-link channel. A timing of the side-link communication may also be determined.

At block 615, a first side-link communication may be transmitted. The side-link communication may be transmitted using the first air interface, the first subcarrier spacing, and the first bandwidth part. Therefore, while the first side-link communication is transmitted using the first air interface, the same subcarrier spacing as the second air interface is used.

At block 620, a second side-link communication may be transmitted. The second side-link communication may be transmitted using the first air interface, the second subcarrier spacing, and the second bandwidth part. Therefore, while the same air interface is used as block 615, a different subcarrier spacing may be used that has been assigned to the second bandwidth part. The timing between blocks 615 and 620 may be based on smart scheduling that is performed to limit any interference due to the use of differing subcarrier spacings between the first bandwidth part and the second bandwidth part.

At block 625, a third side-link communication may be transmitted. The third side-link communication may be transmitted using the second air interface, the first subcarrier spacing from block 615, and the second air-interface side-link channel.

Additionally or alternatively, side-link communications may be received rather than transmitted as detailed in blocks 615-625. In some embodiments, an instance of UE may only communicate using the first air interface or the second air interface, rather than both. In some embodiments, while a first instance of UE may send the first side-link communication of block 615, another instance of UE may send the second side-link communication of block 620. Similarly, another instance of UE may send the third side-link communication of block 625.

Further, since the subcarrier spacing of the second bandwidth part can be varied, after a period of time, a subcarrier spacing and bandwidth subdivision system may assign a different subcarrier spacing to the second bandwidth part. This new subcarrier spacing may be communicated to instances of UE that may use the second bandwidth part for side-link communications. Future side-link communications on the second bandwidth part may then be performed using the new subcarrier spacing.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for using different air interfaces on adjacent frequency channels for side-link communications, the method comprising:
   determining, by an air interface management server system, to set subcarrier spacing in a first side-link channel based on subcarrier spacing of a second side-link channel, wherein the first side-link channel uses a first air interface and the second side-link channel uses a second air interface;

splitting, by the air interface management server system, the first side-link channel into a first bandwidth portion and a second bandwidth portion, wherein the first bandwidth portion of the first side-link channel is directly adjacent to the second side-link channel;

assigning, by the air interface management server system, a first subcarrier spacing to the first bandwidth portion of the first side-link channel, wherein the second side-link channel uses the first subcarrier spacing;

assigning, by the air interface management server system, a second subcarrier spacing to the second bandwidth portion of the first side-link channel, wherein the second subcarrier spacing differs from the first subcarrier spacing; and providing to a plurality of instances of user equipment (UE) that communicate using the first air interface, an indication of the first subcarrier spacing, the second subcarrier spacing, the first bandwidth portion, and the second bandwidth portion.

2. The method for using different air interfaces on adjacent frequency channels for side-link communications of claim 1, wherein the second air interface is a 4G LTE air interface.

3. The method for using different air interfaces on adjacent frequency channels for side-link communications of claim 2, wherein the first air interface is a 5G NR air interface.

4. The method for using different air interfaces on adjacent frequency channels for side-link communications of claim 1, further comprising:
performing a smart scheduling technique to avoid potential interference between side-link communications on the first side-link channel in the first bandwidth portion and the second bandwidth portion.

5. The method for using different air interfaces on adjacent frequency channels for side-link communications of claim 1, further comprising:
transmitting, by a first instance of UE, a first side-link communication using the first air interface as part of the first bandwidth portion using the first subcarrier spacing based on being provided the indication of the first subcarrier spacing, the second subcarrier spacing, the first bandwidth portion, and the second bandwidth portion.

6. The method for using different air interfaces on adjacent frequency channels for side-link communications of claim 1, further comprising:
transmitting, by a first instance of UE, a second side-link communication using the first air interface as part of the second bandwidth portion using the second subcarrier spacing based on being provided the indication of the second subcarrier spacing and the second bandwidth portion.

7. The method for using different air interfaces on adjacent frequency channels for side-link communications of claim 1, further comprising:
changing the second subcarrier spacing to a third subcarrier spacing for the second bandwidth portion of the first side-link channel while maintaining the first subcarrier spacing for the first bandwidth portion of the first side-link channel.

8. The method for using different air interfaces on adjacent frequency channels for side-link communications of claim 1, wherein the side-link communications are selected from a group consisting of:
vehicle to vehicle communications;
vehicle to infrastructure communications; and
vehicle to pedestrian communications.

9. The method for using different air interfaces on adjacent frequency channels for side-link communications of claim 1, wherein the side-link communications comprise basic safety messages (BSMs).

10. The method for using different air interfaces on adjacent frequency channels for side-link communications of claim 9, wherein each BSM comprises: vehicle size data, position data, speed data, heading data, acceleration data, and brake system status data.

11. A system that uses different air interfaces in adjacent side-link frequency channels, the system comprising:
a first air interface system; and
a plurality of instances of user equipment (UE); and
an air interface management server system is configured to:
determine to set subcarrier spacing in a first side-link channel based on subcarrier spacing in a second side-link channel, wherein the first side-link channel uses a first air interface and the second side-link channel uses a second air interface;
split the first side-link channel into a first bandwidth portion and a second bandwidth portion, wherein the first bandwidth portion of the first side-link channel is directly adjacent to the second side-link channel;
assign a first subcarrier spacing to the first bandwidth portion of the first side-link channel, wherein the first side-link channel uses the first subcarrier spacing;
assign a second subcarrier spacing to the second bandwidth portion of the first side-link channel, wherein the second subcarrier spacing differs from the first subcarrier spacing; and
provide, to the plurality of instances of UE via the first air interface system, an indication of the first subcarrier spacing, the second subcarrier spacing, the first bandwidth portion, and the second bandwidth portion.

12. The system for using different air interfaces on adjacent frequency channels for side-link communications of claim 11, wherein the first air interface is a 5G NR air interface.

13. The system for using different air interfaces on adjacent frequency channels for side-link communications of claim 12, wherein the second air interface is a 4G LTE air interface.

14. The system for using different air interfaces on adjacent frequency channels for side-link communications of claim 11, wherein the air interface management server system is further configured to:
perform a smart scheduling technique to avoid potential interference between side-link communications on the first side-link channel in the first bandwidth portion and side-link communications on the first side-link channel in the second bandwidth portion.

15. The system for using different air interfaces on adjacent frequency channels for side-link communications of claim 11, wherein a first instance of UE of the plurality of instances of UE transmits a first side-link communication using the first air interface as part of the first bandwidth portion using the first subcarrier spacing based on being provided the indication of the first subcarrier spacing and the first bandwidth portion.

16. The system for using different air interfaces on adjacent frequency channels for side-link communications of claim 11, wherein the first instance of UE of the plurality of instances of UE transmits a second side-link communication using the first air interface as part of the second bandwidth portion using the second subcarrier spacing based on being provided the indication of the second subcarrier spacing and the second bandwidth portion.

17. The system for using different air interfaces on adjacent frequency channels for side-link communications of claim 11, wherein the air interface management server system is further configured to change the second subcarrier spacing to a third subcarrier spacing for the second bandwidth portion of the first side-link channel while maintaining the first subcarrier spacing for the first bandwidth portion of the first side-link channel.

18. The system for using different air interfaces on adjacent frequency channels for side-link communications of claim 11, wherein the side-link communications are selected from a group consisting of:
vehicle to vehicle communications;
vehicle to infrastructure communications; and
vehicle to pedestrian communications.

19. The system for using different air interfaces on adjacent frequency channels for side-link communications of claim 18, wherein the side-link communications comprise basic safety messages (BSMs).

20. A vehicle system that uses different air interfaces on adjacent frequency channels for side-link communications, the vehicle system comprising:
a first air interface component that performs side-link communications using a first air interface;
a vehicle systems interface; and
one or more processors, configured to:
receive a subcarrier spacing assignment message via the first air interface, wherein:
the subcarrier spacing assignment message indicates: a first bandwidth portion of a first side-link channel; a second bandwidth portion of the first side-link channel; a first subcarrier spacing for the first bandwidth portion; and a second subcarrier spacing for the second bandwidth portion; and
the first bandwidth portion is adjacent to a second side-link channel that uses the first subcarrier spacing and a second air interface;
cause a first side-link communication to be transmitted using the first air interface and the first bandwidth portion of the first side-link channel and the first subcarrier spacing; and
cause a second side-link communication to be transmitted using the first air interface and the second bandwidth portion of the first side-link channel and the second subcarrier spacing.

* * * * *